United States Patent
Jeong et al.

(10) Patent No.: US 12,143,513 B2
(45) Date of Patent: Nov. 12, 2024

(54) APPARATUS AND SERVER FOR V2X SERVICE

(71) Applicant: LG ELECTRONICS INC., Seoul (KR)

(72) Inventors: Seongwoo Jeong, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 17/918,245

(22) PCT Filed: Aug. 10, 2020

(86) PCT No.: PCT/KR2020/010555
§ 371 (c)(1),
(2) Date: Oct. 11, 2022

(87) PCT Pub. No.: WO2022/034933
PCT Pub. Date: Feb. 17, 2022

(65) Prior Publication Data
US 2023/0141992 A1 May 11, 2023

(51) Int. Cl.
*H04L 9/32* (2006.01)
(52) U.S. Cl.
CPC .......... *H04L 9/3268* (2013.01); *H04L 9/3247* (2013.01)
(58) Field of Classification Search
CPC ....... H04L 9/3268; H04L 9/3247; H04W 4/40
See application file for complete search history.

(56) References Cited

U.S. PATENT DOCUMENTS

| | | | | |
|---|---|---|---|---|
| 10,880,812 | B2 * | 12/2020 | Russell | H04W 12/069 |
| 11,523,278 | B2 * | 12/2022 | Kim | H04W 12/069 |
| 2020/0029268 | A1 * | 1/2020 | Russell | H04W 12/06 |
| 2021/0344513 | A1 * | 11/2021 | Russell | H04L 9/0891 |

FOREIGN PATENT DOCUMENTS

| | | |
|---|---|---|
| KR | 10-2014-0058366 A | 5/2014 |
| KR | 10-2015-0007573 A | 1/2015 |
| KR | 10-1584001 B1 | 1/2016 |

OTHER PUBLICATIONS

Msahli et al., "TLS Authentication Using IEEE 1609.2 Certificates", Draft-Msahli-Ipwave-Ieee1609-00.txt, Mar. 29, 2019, XP015132269, pp. 1-11.

Unknown, "IEEE Standard for Wireless Access in Vehicular Environments-Security Services for Applications and Management Messages", IEEE Standards Association, Mar. 2016, XP068106437, pp. 1-240.

3GPP, "3rd Generation Partnership Project; Technical Specification Group Services and System Aspects; Application layer support for Vehicle-to-Everything (V2X) services; Functional architecture and information flows; (Release 16)," 3GPP TS 23.286, V16.3.0, Mar. 2020, pp. 1-64.

* cited by examiner

*Primary Examiner* — Chau Le
(74) *Attorney, Agent, or Firm* — Birch, Stewart, Kolasch & Birch, LLP (57) ABSTRACT

An apparatus for a vehicle-to-everything (V2X) service establishes a secure session with a V2X server by using a transport layer security (TLS) handshake on the basis of an X.509 certificate of the V2X server. The apparatus generates a signed V2X message having a digital signature generated on the basis of a pseudonym certificate. The apparatus encodes the signed V2X message on the basis of the X.509 certificate.

14 Claims, 10 Drawing Sheets

: First Subscription Area

: Second Subscription Area

APPARATUS AND SERVER FOR V2X SERVICE

CROSS REFERENCE TO RELATED APPLICATIONS

This application is the National Stage filing under 35 U.S.C. 371 of International Application No. PCT/KR2020/010555, filed on Aug. 10, 2020, which is hereby expressly incorporated by reference into the present application.

BACKGROUND OF THE DISCLOSURE

Field

The present disclosure relates to a device and a server for vehicle-to-everything (V2X) service.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety, such as vehicle-to-vehicle and vehicle-to-peripheral devices.

SUMMARY OF THE DISCLOSURE

The present disclosure provides a method for vehicle-to-everything (V2X) service and a device using the method.

In an aspect, a device for vehicle-to-everything (V2X) service includes a processor, and a memory operatively coupled with the processor and configured to store instructions that, when executed by the processor, cause the device to perform functions. The functions include acquiring a pseudonym certificate from a certification authority, establishing a secure session with a V2X server using a Transport Layer Security (TLS) handshake based on X.509 certificate of the V2X server, generating an encrypted signed V2X message by encrypting a signed V2X message with a digital signature generated based on the pseudonym certificate based on the X.509 certificate, the signed V2X message including a V2X ID randomly generated by the device and location information of the device, and transmitting the encrypted signed V2X message to the V2X server.

In another aspect, a non-transitory computer-readable medium includes computer-readable instructions stored thereon that are executable by a processor perform functions. The functions include acquiring a pseudonym certificate from a certification authority, establishing a secure session with a V2X server using a Transport Layer Security (TLS) handshake based on X.509 certificate of the V2X server, generating an encrypted signed V2X message by encrypting a signed V2X message with a digital signature generated based on the pseudonym certificate based on the X.509 certificate, the signed V2X message including a V2X ID randomly generated by a V2X device and location information of the V2X device, and transmitting the encrypted signed V2X message to the V2X server.

In still another aspect, a server for vehicle-to-everything (V2X) service includes a processor, and a memory operatively coupled with the processor and configured to store instructions that, when executed by the processor, cause the server to perform functions. The functions include acquiring X.509 certificate from a certification authority, establishing a secure session with a V2X device using a Transport Layer Security (TLS) handshake based on the X.509 certificate, receiving a V2X message from the V2X device, the V2X message including a V2X ID randomly generated by the V2X device and location information of the V2X device, decrypting the received V2X message based on the X.509 certificate, and verifying a digital signature of the decrypted V2X message.

It is possible to provide V2X services to more diverse users as well as vehicles.

DETAILED DESCRIPTION OF THE EMBODIMENTS

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles may include automobiles, ships, aircraft, trains, motorcycles, bicycles, and the like. The vehicle may include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device may be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device may be mounted on a vehicle or electronic device as an on-board unit (OBU) to provide V2X functions and services to the vehicle. A V2X device disposed inside or outside the vehicle may be connected to the vehicle through a wireless interface to provide V2X functions and V2X services to the vehicle.

Figure 1:
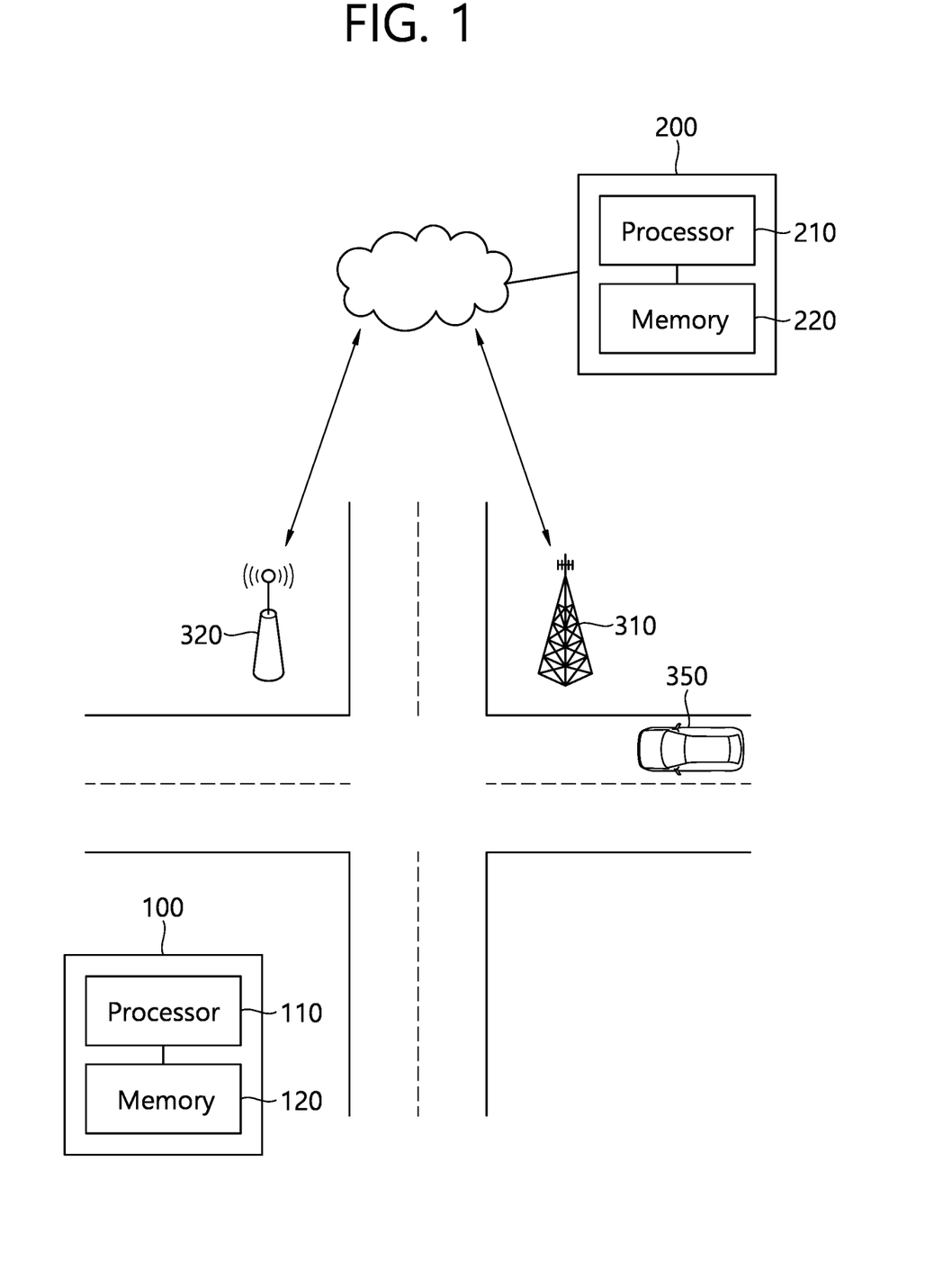
FIG. 1 shows a system to which an embodiment of the present specification is applied.

FIG. 1 shows a system to which an embodiment of the present specification is applied.

A system includes a V2X device 100 and a V2X server 200. The V2X device 100 may communicate with the V2X server 200 through the base station 310 or a Road Side Unit (RSU) 320. The V2X device 100 may communicate with the base station 310, the RSU 320, a neighbor vehicle 350 and/or a neighbor V2X device using a wireless communication protocol. There is no limitation on the wireless communication protocol. The wireless communication protocol may include Dedicated Short Range Communications (DSRC), Cellular-V2X (C-V2X), WiFi, BLUETOOTH and/or cellular communication protocols based on 3rd Generation Partnership Project (3GPP) (e.g. Wideband Code Division Multiple Access (WCDMA), Long Term Evolution (LTE), New Radio (NR), etc.).

The V2X server 200 receives one or more V2X messages from the V2X device 100 within a managed area. The V2X server 200 may forward the one or more collected V2X messages to the subscribing V2X device 100.

The V2X message may periodically or aperiodically be transmitted to the V2X server 200 by the V2X device 100 (or RSU 320), and is a message providing status information of the V2X device 100 (or device managed by the RSU 320). For example, the V2X device 100 may transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements may be added/changed/deleted according to policies or circumstances.

TABLE 1

| Name | Description |
| --- | --- |
| V2X ID | A temporary identifier (ID) for identifying the V2X device sending this message. It is randomly selected by the V2X device and may be changed periodically. The size can be 4 octets. |
| Position | Indicates the location of the V2X device. May contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. May include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message. The V2X device 100 may include a processor 110 and a memory 120. The processor 110 implements the functions of the V2X device 100 and may include one or more software modules. The V2X device 100 may further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 may be a Mobile/Multi-access Edge Computing (MEC)-based server or a centralized-based server. The V2X server 200 may be called another name, such as a Geocast server or a SoftV2X server. The V2X server 200 may include a processor 210 and a memory 220. The processor 210 implements the function of the V2X server 200, and may include one or more software modules.

The processors 110 and 210 may include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein may be stored in the memories 120 and 220 and executed by the processors 110 and 210.

Memories 120 and 220 may store information accessible by processors 110 and 210. The information may include instructions executable by the processors 110 and 210 and/or data processed by the processor. Memories 120 and 220 may include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols may be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

Figure 2:
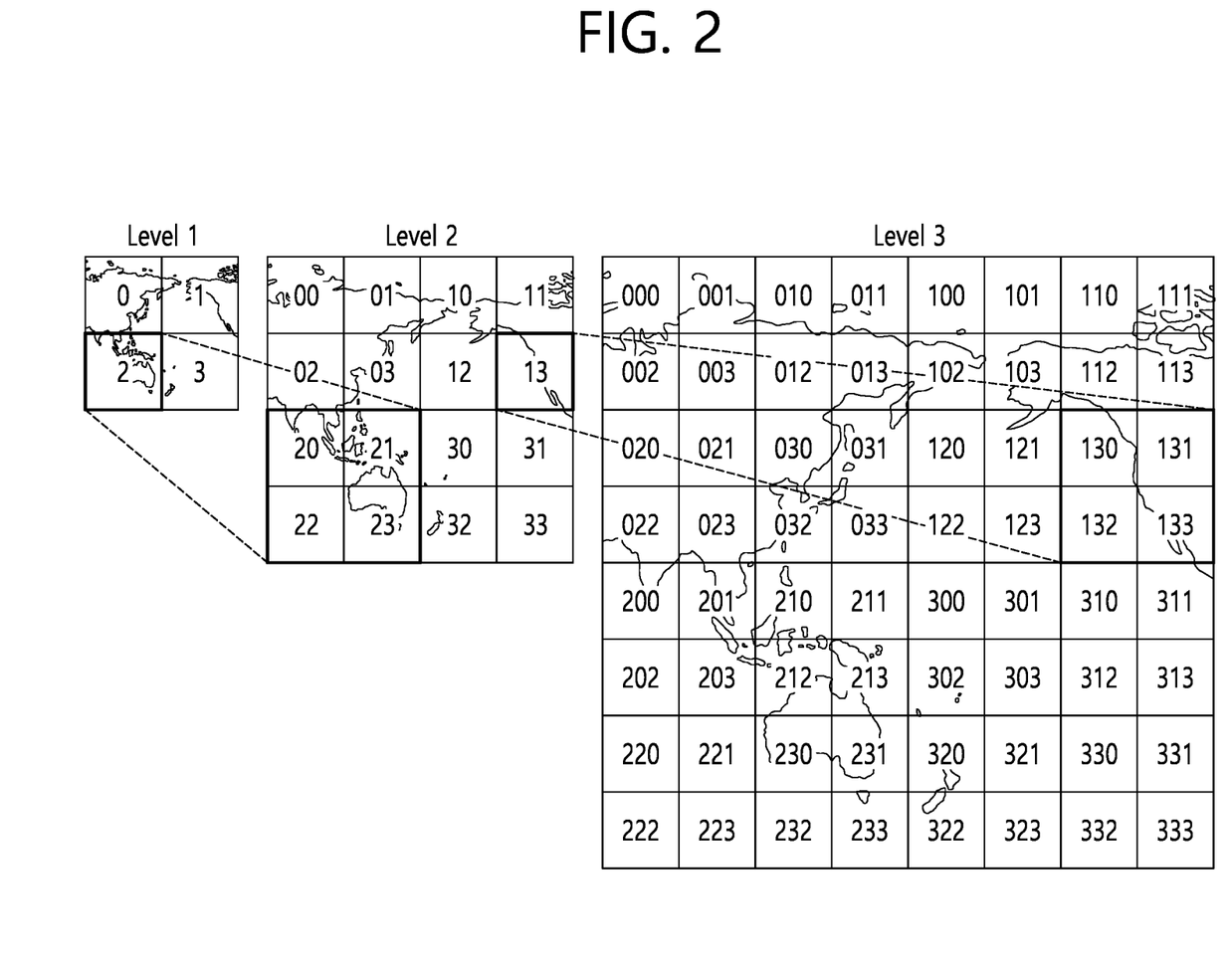
FIG. 2 shows an example of a tile using a quadtree.

FIG. 2 shows an example of a tile using a quadtree.

The quadtree represents a partition of space in two dimensions by decomposing a map (i.e. world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID may have the number of bits corresponding to the level.

The V2X device may acquire the ID of the tile in which it is located based on its location information (e.g. latitude and longitude). The V2X device and/or the V2X server may adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area may be referred to as another name, such as a concerned area, an impact area, or a geocast area. The subscription area contains one or more tiles. The subscription area may be included in one management area, and may be defined across a plurality of management areas managed by a plurality of V2X servers.

Publishing area: The area where the V2X device publishes V2X messages to the V2X server. The publishing area may include one tile in each level. The publishing area may indicate a tile where the V2X device is currently located. Some or all of the publishing area may overlap with the subscription area.

Figure 3:
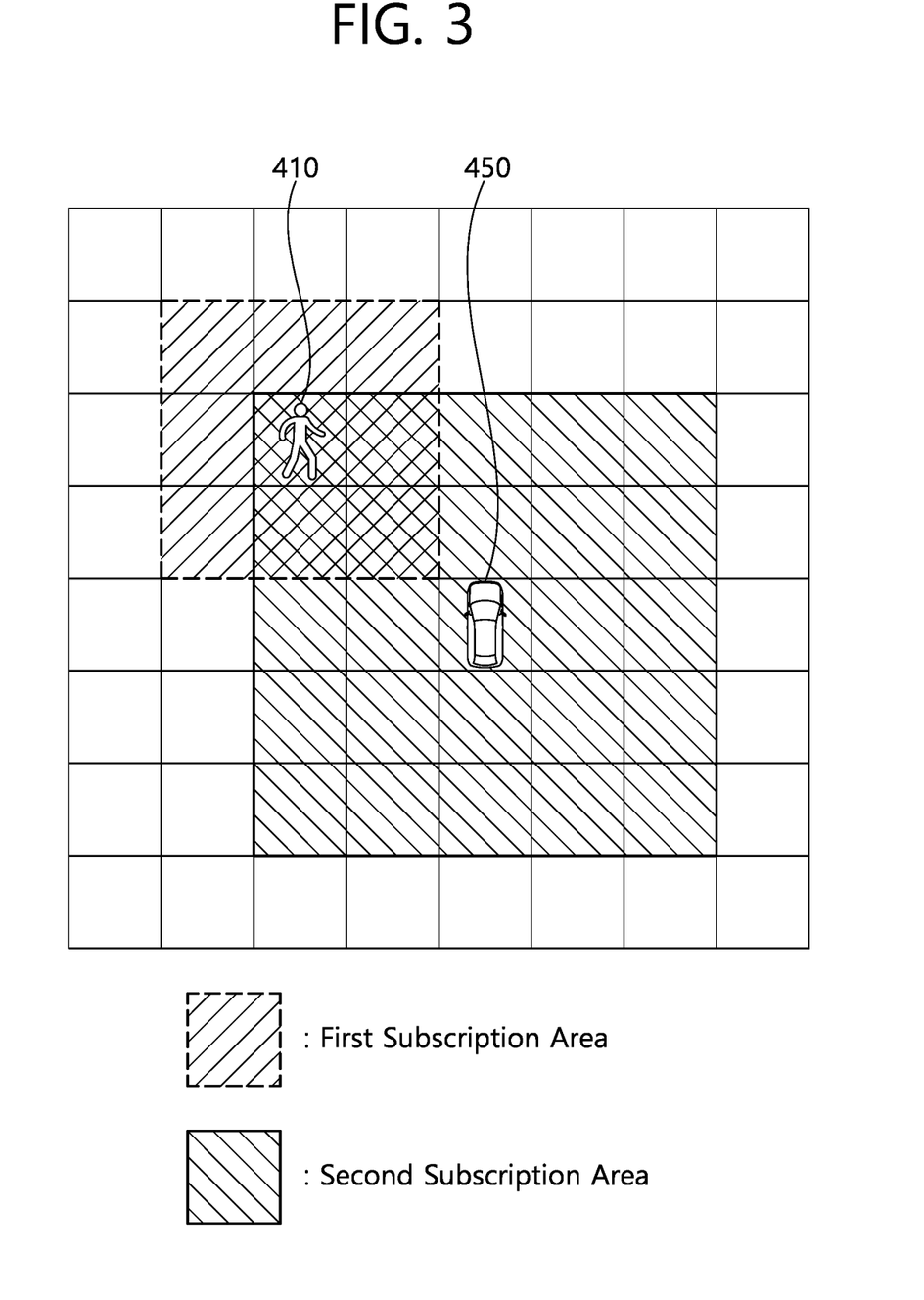
FIG. 3 shows an example in which a subscription area is set.

FIG. 3 shows an example in which a subscription area is set.

A first subscription area is set to the first V2X device 410, and a second subscription area is set to the second V2X device 450. Each V2X device can set/change/delete the subscription area periodically or aperiodically (e.g. when its location is changed). Each V2X device can request setting/change/deletion of the subscription area to the V2X server.

The number of tiles included in the first subscription area is 9 and the number of tiles included in the second subscription area is 25, but the number of tiles included in the subscription area or the shape of the subscription area is not limited. The subscription area may include a tile in which the V2X device is located. Alternatively, the subscription area may include one or more tiles other than a tile in which the V2X device is located.

The first V2X device 410 may generate a first V2X message and periodically send the first V2X message to the V2X server. The second V2X device 450 may generate a second V2X message and periodically send the second V2X message to the V2X server.

The V2X server may forward one or more V2X messages received in or around a subscription area to the V2X device related to the subscription area.

A device that sets a subscription area may be referred to as a "subscriber device". A device that transmits a V2X message to a V2X server can be referred to as a "provider device". A V2X device may be a subscriber device, a provider device, or both a subscriber device and a provider device. The V2X server may forward the V2X messages transmitted by the provider devices in the management area to the subscriber device.

The V2X server may deliver the V2X message of a provider device "associated" to the subscription area of a subscriber device to the subscriber device. A provider device associated with a subscription area of a subscriber device may be referred to as a "subscribed provider device". The provider device associated with the subscription area of the subscriber device may satisfy at least one of the following conditions (i) to (iii): (i) Part or all of the publishing area of the provider device overlaps with the subscription area of the subscriber device. (ii) some or all of the subscription area of the provider device overlaps the subscription area of the subscriber device; and/or (iii) The location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server may forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410. The second V2X device 450 is not a provider device of the first V2X device 410. If condition (ii) is considered, the second V2X device 450 may be a provider device of the first V2X device 410.

Now, a communication method to which the security protocol for the aforementioned V2X system is applied is proposed.

Since V2X services are based on exchanging location or road information of V2X devices, various threats such as illegal information theft, location tracking, etc. may occur.

Accordingly, there is a need to prevent forgery/falsification of a message by using a secure certificate and to ensure anonymity of the user.

An X.509 certificate is used to secure a secure session. The X.509 certificate is a digital certificate based on the public key infrastructure (PKI) standard. The X.509 certificate is issued by a certificate authority. The X.509 certificates operate on an encryption channel based on Transport Layer Security (TLS). TLS requires negotiation between a client and a server through a handshake process, which may cause delay to establish a session. Changing the certificate can take a lot of time because the session must be re-established before the certificate is changed. TLS is a general-purpose security technology with good scalability so that it can be applied to all applications on an IP network, but it is not an optimized technology for V2X communication. In addition, since the size of the X.509 certificate may be larger than the size of the V2X message, it may be inefficient for V2X communication.

Institute of Electrical and Electronics Engineers (IEEE) 1609.2 certificate is also used for V2X service. IEEE 1609.2 certificate refers to a certificate based on IEEE standard 1609.2 "IEEE Standard for Wireless Access in Vehicular Environments—Security Services for Applications and Management Messages". IEEE standard 1609.2b is an amendment to IEEE standard 1609.2. Unless otherwise indicated, IEEE 1609.2 includes IEEE standard 1609.2 and IEEE standard 1609.2b. A certification authority that issues IEEE 1609.2 certificates is also called Security Credentials Management System (SCMS).

In general, a certificate authority may issue several types of certificates depending on the device. For V2X devices, there are an enrollment certificate, a pseudonym certificate, and an identification certificate. The enrollment certificate is used for the V2X device to request another certificate, and can be said to be a unique certificate for V2X device. The pseudonym certificate is used to sign V2X messages for direct communication and has a short validity period. The identification certificate is used to authenticate Vehicle-to-Infrastructure (V2I) applications. Enrollment certificate and application certificate are used for RSU.

Figure 4:
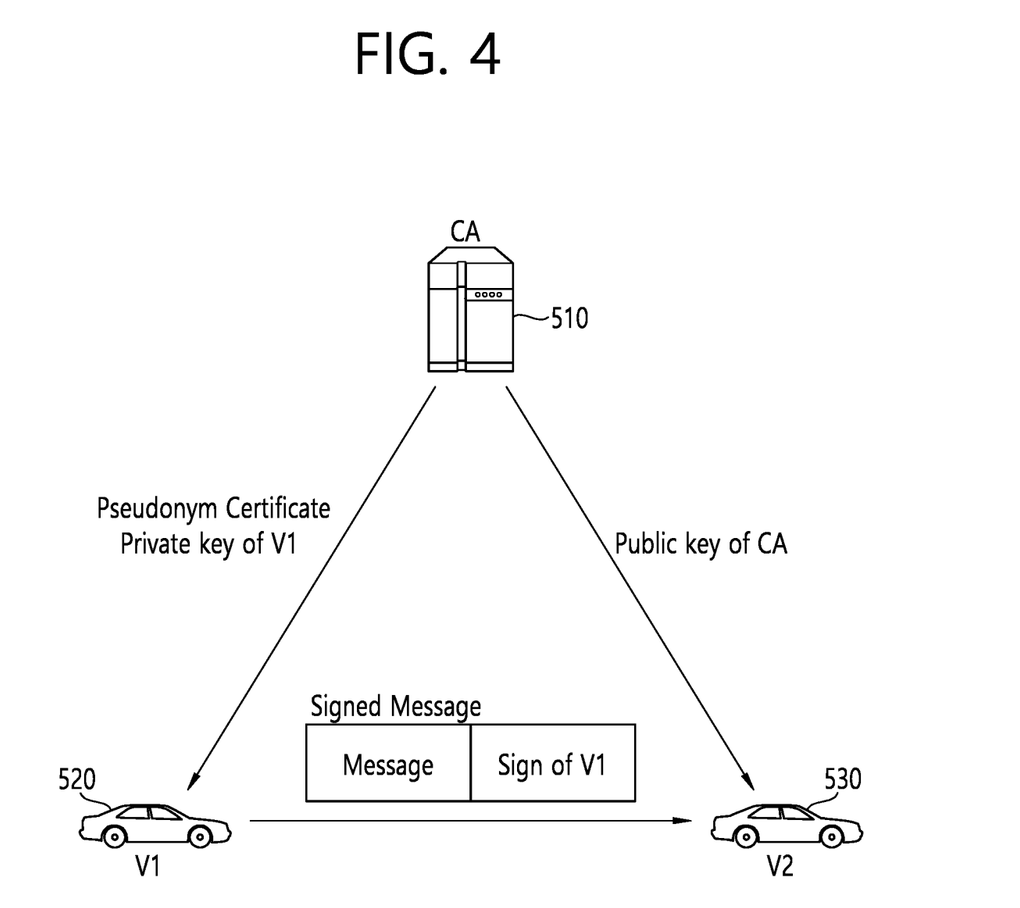
FIG. 4 shows an example of a service using a pseudonym certificate in conventional V2X communication.

FIG. 4 shows an example of a service using a pseudonym certificate in conventional V2X communication.

A certificate authority (CA) 510 issues a pseudonym certificate of a vehicle V1 520 and a private key of V1 520 to V1 520. The pseudonym certificate of V1 520 includes V1's V2X ID, a public key, a validity period, and a digital signature of CA 510.

Assuming that V1 520 communicates with a vehicle V2 530, V1 520 generates a digital signature based on the private key of V1 520 for a V2X message to be transmitted. The signed V2X message includes the digital signature and the pseudonym certificate of V1 520. V1 520 transmits the signed V2X message to V2 530.

V2 530 may prove the validity of the pseudonym certificate of V1 520 by verifying the digital signature of CA 510 included in the pseudonym certificate of V1 520 based on the public key of CA 510. By verifying the digital signature of V1 520 based on the public key of V1 520 obtained in the above process, V2 530 can confirm whether the received V2X message is forged/falsified and whether received V2X message is transmitted by V1 520

Messages in the conventional V2X communication contain only digital signatures and are not encrypted. This means that neighboring vehicles can receive the signed message transmitted by the V2 520 and acquire the contents. This is because the conventional V2X communication is based on the premise that anyone can receive messages in broadcast manner. Therefore, it is not suitable for the proposed V2X service which targets a specific subscriber device.

Hereinafter, the pseudonym certificate is a certificate temporarily used by the V2X device for a specific purpose. The pseudonym certificate can be generated based on V2X ID of a V2X device. The V2X ID has a value randomly generated by the V2X device, and may be changed periodically or aperiodically. The pseudonym certificate can be generated based on IEEE 1609.2, but there are no restriction on standard for generating certificate.

Figure 5:
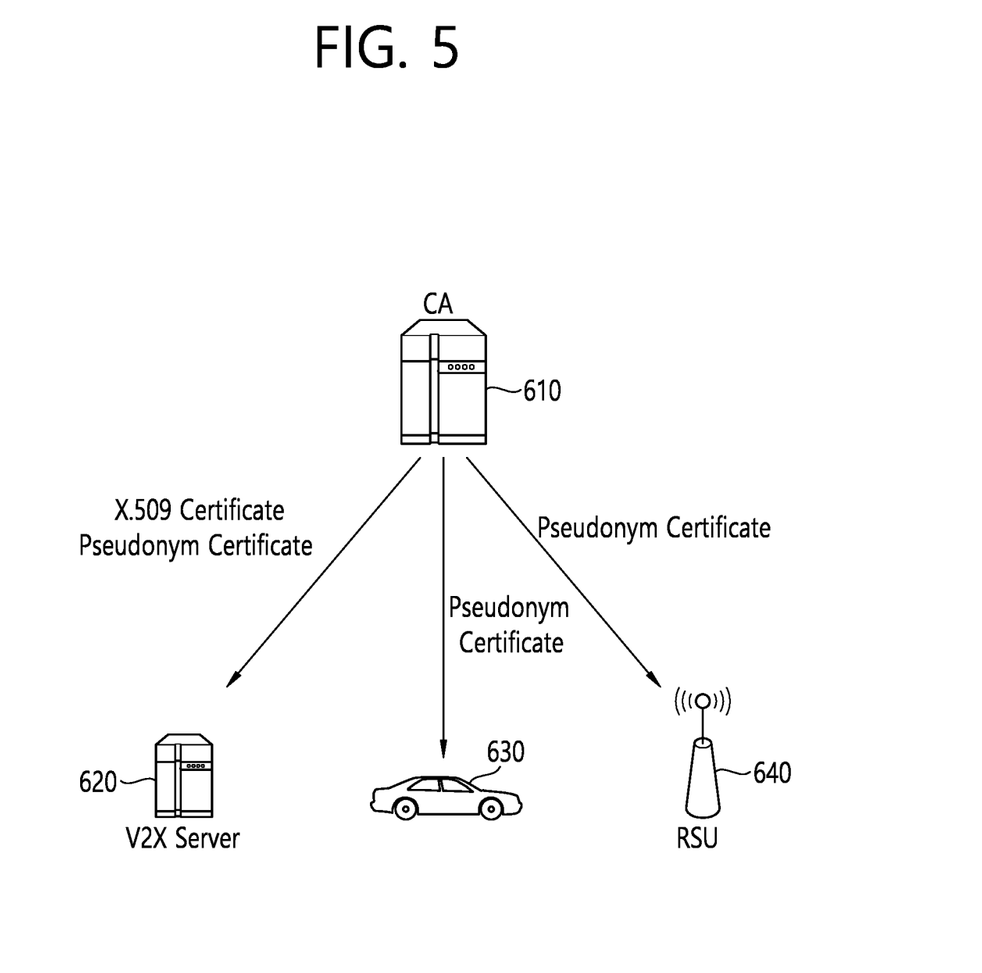
FIG. 5 shows a system for a security protocol according to an embodiment of the present specification.

FIG. 5 shows a system for a security protocol according to an embodiment of the present specification.

CA 610 issues an X.509 certificate and a pseudonym certificate to to V2X server 620. It is shown that one CA 610 issues both the X.509 certificate and the pseudonym certificate, but different CAs may issue the X.509 certificate and the pseudonym certificate, respectively.

CA 610 issues a pseudonym certificate to a V2X device 630. CA 610 may also issue an enrollment certificate and an identification certificate to the V2X device 630.

CA 610 issues a pseudonym certificate to an RSU 640. The CA 610 may issue an enrollment certificate and an application certificate to the RSU 640.

Figure 6:
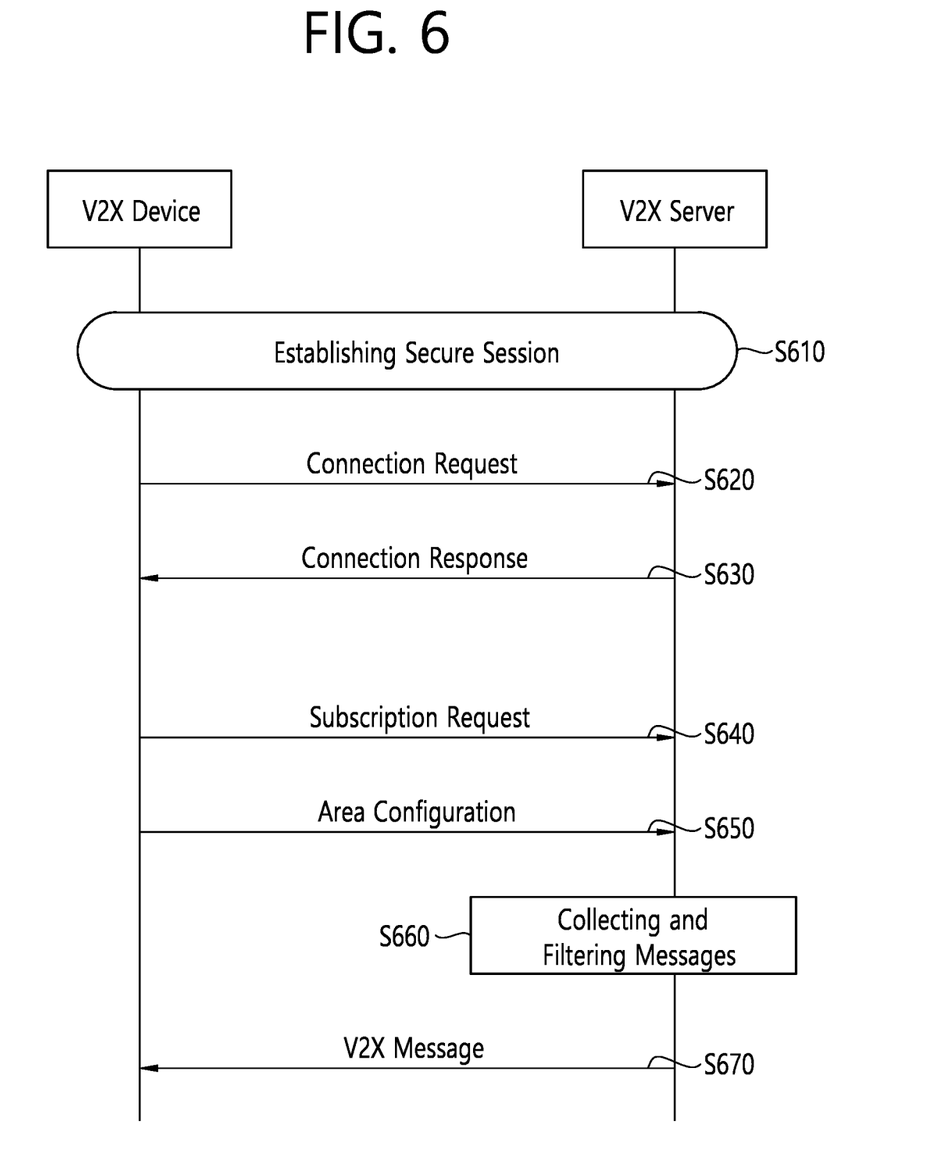
FIG. 6 is a flowchart illustrating a method for a V2X service according to an embodiment of the present specification.

FIG. 6 is a flowchart illustrating a method for a V2X service according to an embodiment of the present specification.

In step S610, a V2X device and a V2X server establish a secure session. To create the secure session, the V2X server's X.509 certificate may be used in the TLS handshake process. The secure session is established by exchanging a public key and parameters included in the X.509 certificate during the TLS handshake process.

In step S620, the V2X device sends a connection request message to the V2X server. The connection request message is encrypted based on the X.509 certificate. The connection request message includes the V2X ID of the V2X device. The V2X server can decrypt the encrypted connection request message based on its X.509 certificate.

In step S620, the V2X server transmits a connection response message in response to the connection request message to the V2X device. The connection response message is encrypted based on the X.509 certificate.

In step S630, the V2X device sends a subscription request message for requesting subscription of the V2X service to the V2X server. The subscription request message may include information about the V2X ID, location, etc. of the V2X device.

The subscription request message is encrypted based on the X.509 certificate and digitally signed based on the pseudonym certificate. Since a message is encrypted based on the X.509 certificate of the established secure session, only the V2X device and the V2X server can decrypt the message, but other devices cannot decrypt the message. In addition, since the message is digitally signed based on the pseudonym certificate, the V2X server can confirm that the message is transmitted by the V2X device. The subscription request message includes the same V2X ID as the V2X ID included in the connection request message. Accordingly, the V2X server can confirm that the requesting V2X device is the V2X device which already established the secure session.

The V2X server may transmit a subscription response message for granting or rejecting subscription to the V2X device in response to the subscription request message.

If the subscription request message is not received before a certain period of time expires after the secure session is established, the V2X server may forcibly terminate the connection. Alternatively, if the V2X ID in the received subscription request message is not the same as the V2X ID in the previous connection request message, the V2X server may forcibly terminate the connection. After the connection is terminated, a reconnection request may be delayed, and the V2X server can adjust the reconnection delay time according to the load.

Hereinafter, messages exchanged between the V2X device and the V2X server are encrypted based on the X.509 certificate and digitally signed based on the pseudonym certificate.

Whenever V2X ID and/or pseudonym certificate is changed, the V2X device may send an update message for maintaining the V2X service to the V2X server. The V2X device may periodically transmit the update message to the V2X server. The update message includes information about the updated V2X ID, and may be digitally signed based on the updated anonymous certificate.

In step S650, the V2X device may send area configuration for the V2X service to the V2X server. The area configuration may be included in a separate message or may be included in the subscription request message. The area configuration may include information about setting and/or changing the subscription area.

In step S660, the V2X server may collect V2X messages from V2X devices in a management area, and perform message filtering.

In step S670, the V2X server transmits V2X messages of surrounding V2X devices belonging to the subscription area of the V2X device to the V2X device. The V2X device is a subscriber device, and the surrounding V2X devices are provider devices. If there are a plurality of V2X messages to be sent to the V2X device, the plurality of V2X messages may be transmitted separately or transmitted as a single message.

Now, message exchange between a legacy V2X device and a V2X device will be described.

An RSU is deployed around the road and communicates with the V2X device through a wireless medium based on a direct communication protocol (e.g., DSRC, C-V2X, etc.). A V2X device that supports only communication with the RSU and/or device-to-device direct communication is referred to as a legacy V2X device. Legacy V2X devices only support broadcast transmission.

The RSU establishes a secure session with the V2X server, similarly to the V2X device according to the embodiment of FIG. 6 described above, and performs encryption and digital signature based on X.509 certificate of the V2X server and pseudonym certificate of the RSU.

The RSU may include a memory and a processor. The memory may store information accessible by the processor. The information may include instructions executable by the processor and/or data processed by the processor. The RSU may further include a wireless modem for wireless link communication and a wired modem for wired link communication.

Figure 7:
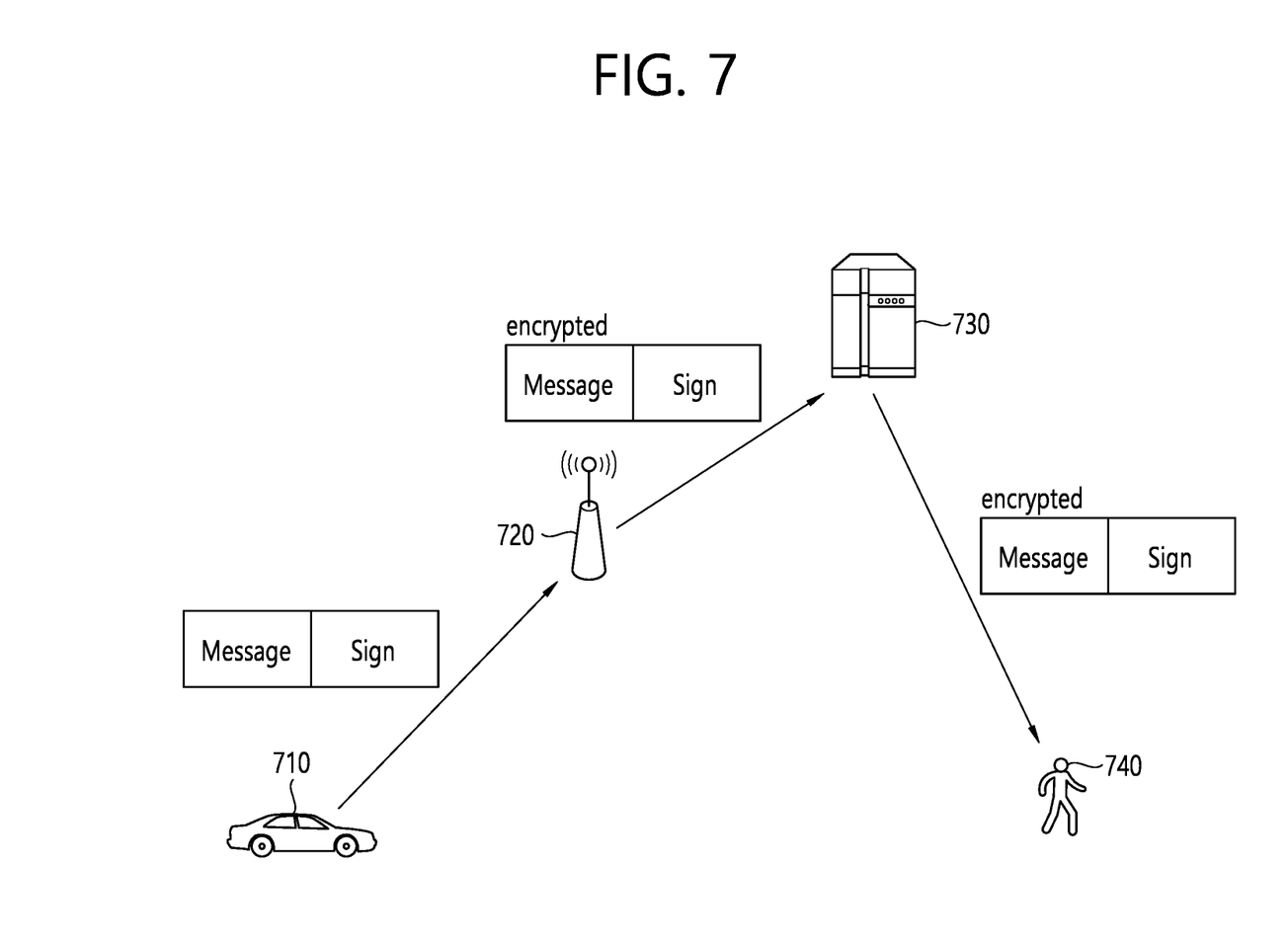
FIG. 7 shows an example in which a legacy V2X device transmits a message to a V2X device according to an embodiment of the present specification.

FIG. 7 shows an example in which a legacy V2X device transmits a message to a V2X device according to an embodiment of the present specification. Secure sessions are established between an RSU 720 and a V2X server 730, and between the V2X server 730 and a V2X device 740, and the subscription area of the V2X device 740 is also set.

The legacy V2X device 710 broadcasts a signed V2X message. The signed V2X message includes a pseudonym certificate of the legacy V2X device 710 and a digital signature of the legacy V2X device 710 generated based on the pseudonym certificate of the legacy V2X device 710.

After receiving the signed V2X message of the legacy V2X device 710, the RSU 720 encrypts the signed V2X message based on the X.509 certificate of the V2X server 730, and sends the encrypted signed V2X message to the V2X server 730. In order to reduce traffic and load on the server, the RSU 720 may perform message filtering.

Assume that the legacy V2X device 710 is located in the subscription area of the V2X device 740. The V2X server 730 verifies the encrypted signed V2X message, and sends this message to the V2X device 740. In order to reduce traffic and load on the server, the V2X server 730 may perform message filtering.

The V2X device 740 may decrypt and verify the received encrypted signed V2X message. In order to reduce load due to message verification, a verification filtering method may be applied, which will be described later.

Figure 8:
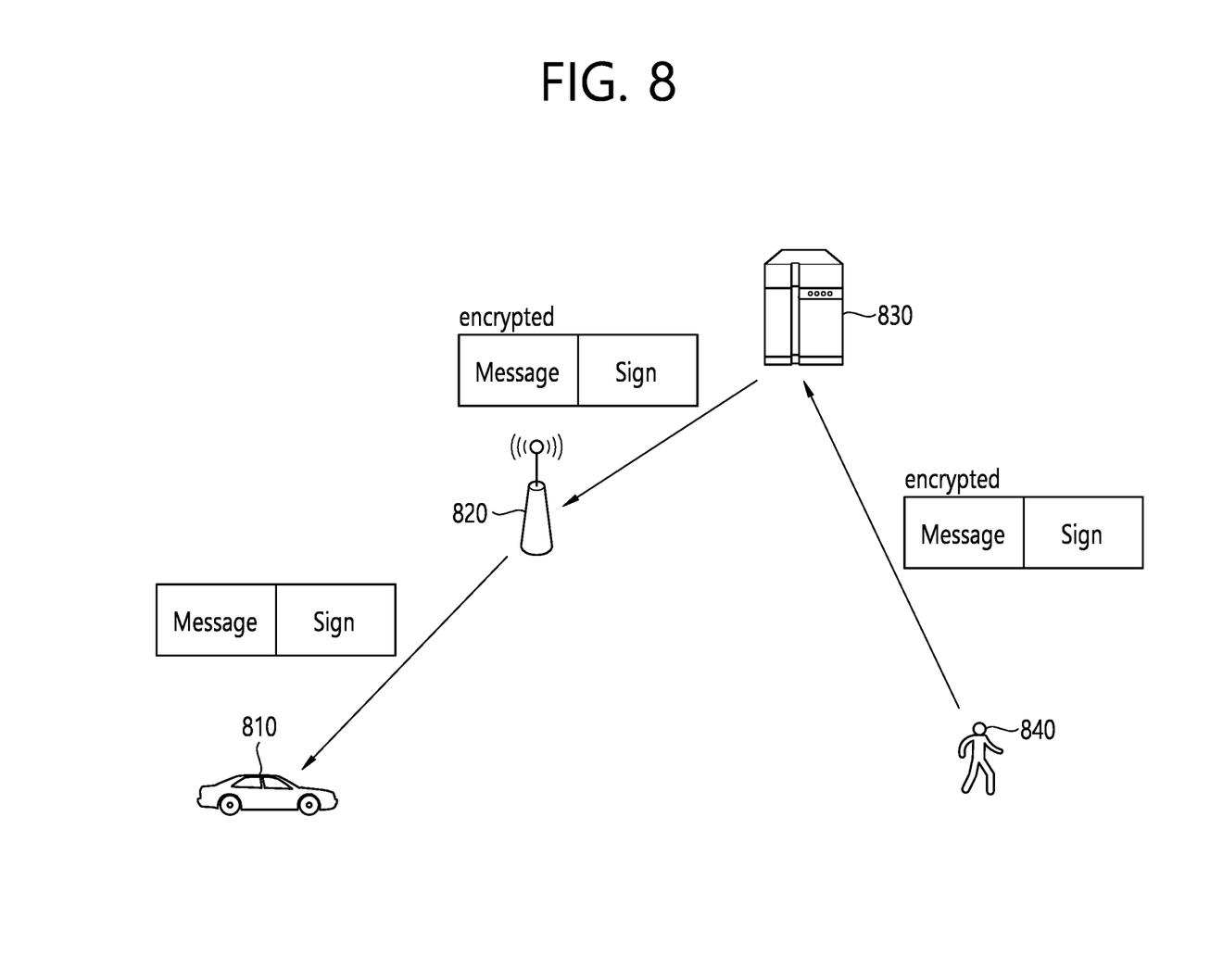
FIG. 8 shows an example in which a V2X device transmits a message to a legacy V2X device according to an embodiment of the present specification.

FIG. 8 shows an example in which a V2X device transmits a message to a legacy V2X device according to an embodiment of the present specification. Secure sessions are established between an RSU 820 and a V2X server 830, and between the V2X server 830 and a V2X device 840. An RSU subscription area of the RSU 820 is also set. The V2X server 830 transmits, to the RSU 820, a V2X message which is transmitted by the V2X device associated with the RSU subscription area.

The V2X device 840 transmits an encrypted signed V2X message to the V2X server 830. A signed V2X message includes a pseudonym certificate of the V2X device 840 and a digital signature of the V2X device 840 generated based on the pseudonym certificate of the V2X device 840. The V2X device 840 may generate the encrypted signed V2X message by encrypting the signed V2X message based on the X.509 certificate of the V2X server 830.

Assume that the V2X device 840 is located within the RSU subscription area of the RSU 820. The V2X server 830 verifies the encrypted signed V2X message, and sends this message to the RSU 820. In order to reduce traffic and load on the server, the V2X server 830 may perform message filtering.

The RSU 820 decrypts and verifies the encrypted signed V2X message. The RSU 820 may broadcast an unencrypted signed V2X message to the legacy V2X device 810.

The RSU 820 may transmit a V2X message using a digital signature generated based on an application certificate when performing a specific function such as threat assessment (TA).

Figure 9:
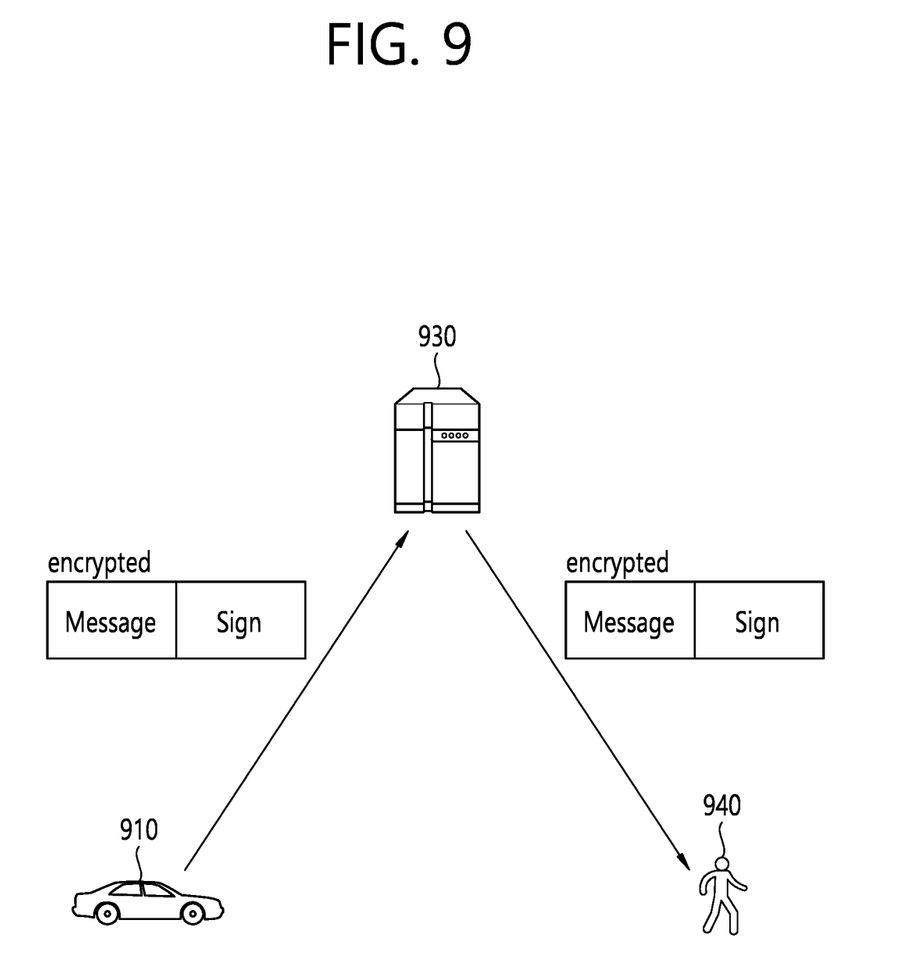
FIG. 9 shows an example in which a V2X message is transmitted between V2X devices according to an embodiment of the present specification.

FIG. 9 shows an example in which a V2X message is transmitted between V2X devices according to an embodiment of the present specification. Secure sessions are established between a V2X device 910 and a V2X server 930, and between a V2X device 940 and the V2X server 930. The V2X device 910 and the V2X device 940 are also in a state in which a subscription area is set, respectively.

The V2X device 910 transmits an encrypted signed V2X message to the V2X server 930. A signed V2X message includes a pseudonym certificate of the V2X device 910 and a digital signature of the V2X device 910 generated based on the pseudonym certificate of the V2X device 910. The V2X device 910 may generate the encrypted signed V2X message by encrypting the signed V2X message based on the X.509 certificate of the V2X server 930.

Assume that the V2X device 910 is located in the subscription area of the V2X device 940. The V2X server 930 verifies the encrypted signed V2X message, and sends this message to the V2X device 940. In order to reduce traffic and load on the server, the V2X server 930 may perform message filtering.

The V2X device 940 may decrypt and verify the received encrypted signed V2X message. In order to reduce the load due to message verification, a verification filtering method may be applied.

Now, message filtering of V2X devices, V2X servers and RSUs will be described.

In general, a V2X device is a portable device using a battery, and reducing the amount of computation of the device is one of the important factors for power management. It may consume a lot of resources for the V2X device to perform message verification on all received messages. Message verification includes message forgery/falsification, authorization authentication for V2X services, and the like. Therefore, a method for reducing the number of verifications so that the V2X device receives a valid message is required.

First, an RSU may not transmit all messages received from a legacy V2X device to a V2X server, but only the verified messages to the V2X server. The RSU does not simply relay messages, but verifies the received message based on the certificate of the received message (for example, message forgery/falsification check, authentication, etc.), and can transmit only valid messages to the V2X server. Optionally, the RSU may transmit the V2X message received from the legacy V2X device belonging to its publishing area to the V2X server without verification. This message may be required to be forward quickly such as an impending collision.

The RSU may selectively transmit a message received from the legacy V2X device located within the RSU subscription area to the V2X server in consideration of the speed/heading of the corresponding legacy V2X device. The RSU may adjust the message transmission period according to the speed of the legacy V2X device within the RSU subscription area. The higher the speed, the shorter the message transmission period can be. For example, when not moving, the period may be set as 5 seconds, when the speed is 10 km/h or less, the period may be set as 2 seconds, when the speed is 10 km/h to 30 km/h, the period may be set as 1 second, when the speed is 30 km/h to 50 km/h, the period may be set as 500 ms, and when the speed is 50 km/h or more, the period may be set as is 100 ms. The RSU may change the transmission period depending on the road environment and traffic state.

When a legacy V2X device moves out of the RSU subscription area, the RSU may not transmit a message received from the corresponding legacy V2X device to the V2X server, or may transmit the message to the V2X server with a relatively low probability or short transmission period.

Second, a V2X server may transmit a message received from a RSU to a V2X device after completing verification using location information and legacy V2X device information. By checking the authentication and/or integrity of the received message, only valid messages can be transmitted to the V2X device. The V2X server can utilize the location, speed, heading, etc. of the legacy V2X device to set priorities and apply message verification criteria according to the priority. Messages related to emergency vehicles, dangerous areas (traffic accidents, road construction, icy roads, etc.) may have a high priority. If a V2X message has a high priority, a verification flag may be added to the V2X message.

The V2X server may transmit a message in consideration of data traffic. The V2X server can adjust the message transmission period according to the degree of risk by considering location, speed, heading, etc. of the V2X device that transmits the message.

Figure 10:
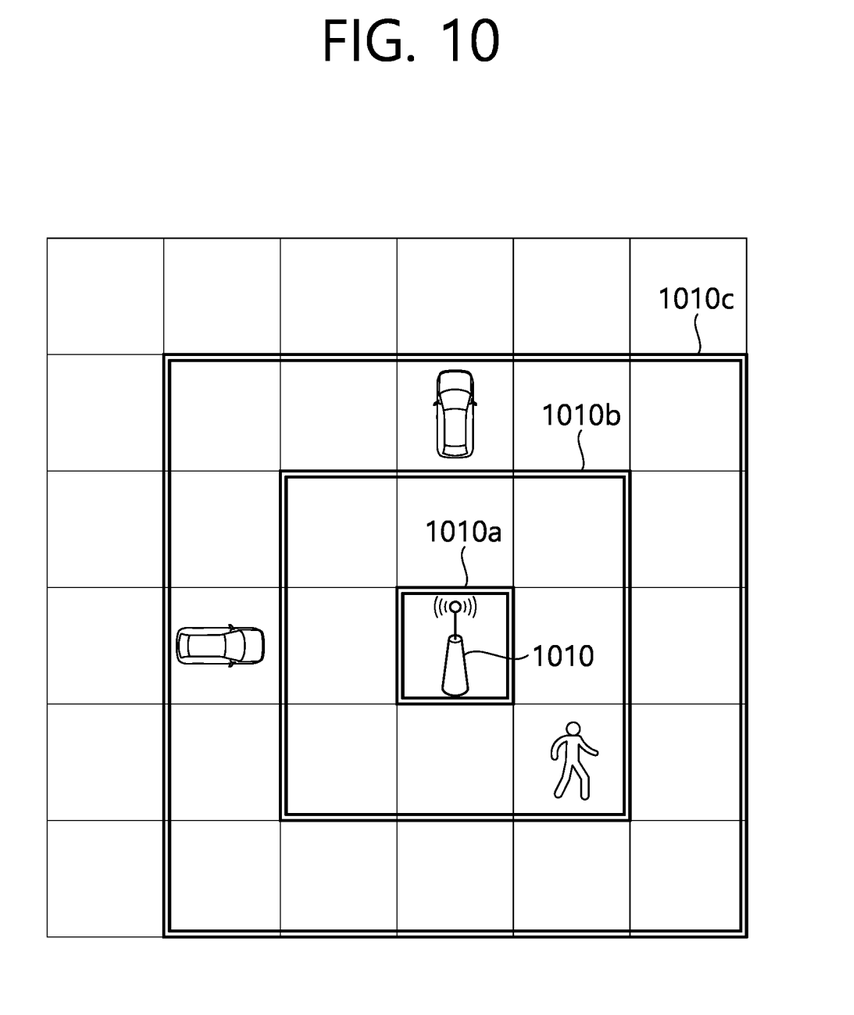
FIG. 10 shows an example of message filtering according to an area of an RSU.

FIG. 10 shows an example of message filtering according to an area of an RSU.

There are three areas for an RSU 1010. A publishing area 1010*a* includes a tile in which the RSU 1010 is located. A RSU subscription area 1010*b* includes one or more tiles in which the RSU 1010 has completed a subscription application to a V2X server. The RSU management area 1010*c* includes one or more tiles belonging to a distance capable of communicating with the RSU 1010.

The RSU 1010 may transmit, to the V2X server without verification, a message received from a legacy V2X device (or V2X device) belonging to the publishing area 1010*a*.

The RSU 1010 may transmit, to the V2X server, a message received from a legacy V2X device (or V2X device) belonging to the RSU subscription area 1010*b* after completing message verification. A verification flag may be added to the verified message. If a legacy V2X device is expected to enter the RSU management area 1010*c* from the RSU subscription area 1010*b* within a certain period of time, the message received from the legacy V2X device may not be transmitted to the V2X server.

The RSU 1010 may not send a message received from a legacy V2X device (or V2X device) belonging to the RSU management area 1010*c* to the V2X server. If a legacy V2X device is expected to enter the RSU subscription area 1010*b* in the RSU management area 1010*c* within a certain period of time, the RSU 1010 treats the legacy V2X device as a legacy V2X device belonging to the RSU subscription area 1010*b*.

A method in which V2X device, RSU and V2X server perform verification according to security and traffic capacity is proposed. V2X device, RSU and V2X server can periodically share information about security and traffic capacity.

Each device initially sets a maximum capacity. Each device can periodically update its verifiable capacity. The smaller the capacity each device can accommodate, the shorter the period can be chosen. For example, if the capacity is less than 50%, the period may be set as 30 seconds, if the capacity is 50% to 65%, the period may be set as 15 seconds, if the capacity is 65% to 80%, the period may be set as 8 seconds, and if the capacity is 80% or more, the period may be set as 1 second. The V2X server may request the RSU or the V2X device to change the range of capacity and period depending on traffic.

When an RSU receives more than a certain amount of traffic during a specific period, the RSU may perform filtering and verification functions in consideration of security capability. The RSU may check the authentication and integrity of the received message in consideration of the security capacity. For example, if the security capacity in use is less than 80%, the RSU performs all functions. If the security capacity being used is 80% or more, only authentication is performed and a flag related to authentication is set. The RSU may transmit a message with the flag to the V2X server.

A V2X server can perform filtering and verification functions according to security and traffic capacity. When the traffic or security capacity exceeds a certain level, the V2X server may transmit a V2X message having a verification flag indicating that verification is complete to the V2X device.

If the traffic/security capacity in use is lower than a first level (e.g., 60%), the V2X server does not execute the verification function. If the traffic/security capacity in use is between the first level and a second level (e.g., 80%), the V2X server may execute the verification function according to priority in consideration of the location, speed, heading, etc. of the V2X device. If the traffic/security capacity being used is higher than the second level, the V2X server can transmit after verifying all messages.

A verification flag indicating that the message is a verified message may be added to the verified message.

A V2X device can selectively verify received messages according to security and traffic capacity. The V2X device can verify all incoming messages if the security capacity being used is less than a certain threshold (e.g., 60%). If the security capacity in use exceeds a certain threshold (e.g. 60%), the V2X device can decide whether to validate the message according to certain conditions.

A V2X device may determine whether a received message is verified based on a verification flag of the received message. If the verification flag does not exist in the received message, the V2X device verifies all received messages. If the verification flag is present in the received message or the verification flag has a specific value (e.g., '1'), the V2X device may randomly select and verify the received message. And, a verification counter may be introduced. If the verified message is valid, the value of the verification counter is incremented, and if the verified message is invalid, the value of the verification counter is decremented. For example, if the verified message is valid, the value of the verification counter may increase by 1, and if the verified message is invalid, the value of the verification counter may decrease by −10. The verification period may be extended as the value of the verification counter is small, and the verification period may be reduced as the value of the verification counter is high. Alternatively, lower priority may be given as the value of the verification counter is smaller, and higher priority may be given as the value of the verification counter is higher. As the verification period extends, the rate at which verification is randomly selected increases, and the priority of verification increases.

In the above examples, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A device for vehicle-to-everything (V2X) service, the device comprising:
   a processor; and
   a memory operatively coupled with the processor and configured to store instructions that, when executed by the processor, cause the device to perform functions comprising:
   acquiring a pseudonym certificate from a certification authority;
   establishing a secure session with a V2X server using a Transport Layer Security (TLS) handshake based on X.509 certificate of the V2X server;
   generating an encrypted signed V2X message by encrypting a signed V2X message with a digital signature generated based on the pseudonym certificate based on the X.509 certificate, the signed V2X message including a V2X ID randomly generated by the device and location information of the device; and
   transmitting the encrypted signed V2X message to the V2X server.

2. The device of claim 1, wherein the pseudonym certificate conforms with Institute of Electrical and Electronics Engineers (IEEE) 1609.2 standard.

3. The device of claim 1, wherein the pseudonym certificate includes the V2X ID.

4. The device of claim 1, wherein the functions further comprise:
   transmitting a connection request message to the V2X server before transmitting the encrypted signed V2X message, the connection request message including the V2X ID.

5. The device of claim 4, wherein the connection request message is encrypted based on the X.509 certificate.

6. The device of claim 1, wherein the functions further comprise:
   transmitting a subscription request message for the V2X service to the V2X server, the subscription request message including the V2X ID and information for setting a subscription area for the device, the subscription request message further includes a digital signature generated based on the pseudonym certificate, the subscription request message being encrypted based on the X.509 certificate.

7. A non-transitory computer-readable medium having computer-readable instructions stored thereon that are executable by a processor perform functions comprising:
   acquiring a pseudonym certificate from a certification authority;
   establishing a secure session with a V2X server using a Transport Layer Security (TLS) handshake based on X.509 certificate of the V2X server;
   generating an encrypted signed V2X message by encrypting a signed V2X message with a digital signature generated based on the pseudonym certificate based on the X.509 certificate, the signed V2X message including a V2X ID randomly generated by a V2X device and location information of the V2X device; and
   transmitting the encrypted signed V2X message to the V2X server.

8. The non-transitory computer-readable medium of claim 7, wherein the pseudonym certificate conforms with Institute of Electrical and Electronics Engineers (IEEE) 1609.2 standard.

9. The non-transitory computer-readable medium of claim 7, wherein the pseudonym certificate includes the V2X ID.

10. The non-transitory computer-readable medium of claim 7, wherein the functions further comprise:
    transmitting a connection request message to the V2X server before transmitting the encrypted signed V2X message, the connection request message including the V2X ID.

11. The non-transitory computer-readable medium of claim 7, wherein the functions further comprise:
    transmitting a connection request message to the V2X server before transmitting the encrypted signed V2X message, the connection request message including the V2X ID.

12. The non-transitory computer-readable medium of claim 11 wherein the connection request message is encrypted based on the X.509 certificate.

13. The non-transitory computer-readable medium of claim 7, wherein the functions further comprise:

transmitting a subscription request message for the V2X service to the V2X server, the subscription request message including the V2X ID and information for setting a subscription area for the device, the subscription request message further includes a digital signature generated based on the pseudonym certificate, the subscription request message being encrypted based on the X.509 certificate.

14. A server for vehicle-to-everything (V2X) service, the server comprising:
   a processor; and
   a memory operatively coupled with the processor and configured to store instructions that, when executed by the processor, cause the server to perform functions comprising:
   acquiring X.509 certificate from a certification authority;
   establishing a secure session with a V2X device using a Transport Layer Security (TLS) handshake based on the X.509 certificate;
   receiving a V2X message from the V2X device, the V2X message including a V2X ID randomly generated by the V2X device and location information of the V2X device;
   decrypting the received V2X message based on the X.509 certificate; and
   verifying a digital signature of the decrypted V2X message.

* * * * *